Patented July 13, 1948

2,444,940

UNITED STATES PATENT OFFICE 2,444,940

PRODUCTION OF TITANIUM DIOXIDE PIGMENTS

Max J. Mayer, Scarsdale, N. Y.

No Drawing. Application December 30, 1943, Serial No. 516,213

9 Claims. (Cl. 23—202)

This invention relates to the production of titanium oxide pigments and has special reference to novel purification of seed for use in the hydrolyses of hydrolyzable titanium salt dispersion, the hydrolysate of which yields rutile titanium dioxide pigment on calcination.

In the hydrolyses of titanium salt solutions, particularly titanium sulfate solutions, it is generally desirable that the seed nuclei prepared from dispersions containing monovalent anions be freed of such monovalent anions prior to their use as seed. For such removal of extraneous anions, laborious coagulation, filtration and washing has been resorted to heretofore.

Among the objects of this invention is the provision of a method of removing such monovalent anions from the titanium hydrate nuclei that is more efficient, cheaper and less laborious than the methods heretofore employed and does not impair the efficacy of the nuclei as seed.

A further object of this invention is the provision of a process of removing monovalent anions from titanium hydrate nuclei prepared by a variety of methods and materials.

Other, further and more specific objects of this invention will become readily apparent to persons skilled in the art from a consideration of the following description.

I have found by dialyzing dispersions of nuclear titanium hydrate, prepared by a wide variety of ways and from a wide variety of materials, that effective and efficient removal of undesirable extraneous anions is accomplished in a cheaper and easier manner than by the processes formerly practiced. I have also found that the values of the nuclear titanium hydrate as seed in hydrolysis are not impaired.

My invention is applicable to various types of cured seed, such as those prepared from peptized sols, solutions, dilute seeds, etc., whether or not stabilizers are present during curing, as will be seen from the following examples.

Example I

Portions of titanium chloride solution, 237 g./l. $TiO_2$ and 381 g./l. HCl and made from titanium tetrachloride were treated as follows:

(a) 42.2 c. c. of the titanium chloride solution were added to water so that the final volume was one liter. This is a concentration of 10 g./l. $TiO_2$. The solution was heated 10 minutes at 90° C. to develop the nuclear properties, after which the resulting dispersion was clear and opalescent.

(b) 42.2 c. c. of the titanium chloride solution and 11.4 c. c. of a solution containing 17.5 g./l. $H_2SO_4$ were added to water, so that the final volume was one liter. The concentration was then 10 g./l. $TiO_2$, with $H_2SO_4$ equal to 2% of $TiO_2$ content and serving as a stabilizer. The solution was heated 10 minutes at 90° C. to develop the nuclear properties, after which the resulting dispersion was clear and opalescent.

(c) 84.4 c. c. of the titanium chloride solution were added to water so that the final volume was one liter. The solution was heated 10 minutes to develop the nuclear properties, after which the resulting dispersion was stable, but rather cloudy.

(d) 84.4 c. c. of the titanium chloride solution and 22.8 c. c. of a solution containing 17.5 g./l. $H_2SO_4$ were added to water so that the final volume was one liter. The concentration was then 20 g./l. $TiO_2$, with $H_2SO_4$ equal to 2% of the $TiO_2$ content. The solution was heated 10 minutes at 90° C. to develop the nuclear properties, after which the resulting dispersion was clear and opalescent.

Example II

Pure titanium sulfate liquor, made from titanyl sulfate and having

| | |
|---|---|
| $TiO_2$ _____ g./l__ | 209 |
| $H_2SO_4$ _____ g./l__ | 397 |
| Acid factor_____ | 1.55 | was used. The acid factor is the mol ratio of free plus combined acid to $TiO_2$.

To 814 c. c. of the above solution, under rapid agitation, was added a water slurry of 190 g. calcium carbonate. The precipitated calcium sulfate was removed by filtration. A saturated solution of barium chloride was then added, in amount just sufficient to precipitate from solution the remaining sulfate ions. The precipitated barium sulfate was removed by filtration and 3 different parts of the filtrate were treated as follows:

(a) The first part, containing 20 g. $TiO_2$, was diluted to one liter and heated 10 minutes at 90° C. to develop the nuclear properties, after which the resulting dispersion was stable and opalescent.

(b) The second part, containing 60 g. $TiO_2$, was treated with citric acid, equivalent to an amount of $H_2SO_4$ equal to 2% of the $TiO_2$ content, diluted to one liter, and heated 10 minutes at 90° C. to develop the nuclear properties, after which the resulting dispersion appeared stable and opalescent.

(c) The third part, containing 90 g. $TiO_2$, was treated with citric acid, equivalent to an amount of $H_2SO_4$ equal to 4% of the $TiO_2$ content, diluted to one liter, and heated 10 minutes at 90° C. to develop the nuclear properties, after which the resulting dispersion appeared stable and opalescent.

Example III

A titanium sulfate solution, made by ilmenite attack with $H_2SO_4$, and having

| | |
|---|---|
| Total $TiO_2$ | g./l.. 284 |
| Reduced $TiO_2$ | g./l.. 6.1 |
| Fe | g./l.. 61 |
| Total $H_2SO_4$ | g./l.. 710 |
| Active $H_2SO_4$ | g./l.. 603 |
| Acid factor | 1.73 | was used to prepare nuclear dispersions as follows:

(a) By one step precipitation, in which 598 c. c. of the above solution were treated with 170 g./l. $Na_2CO_3$ solution, to precipitate titanium hydrate at 7.0 pH.

The hydrate, containing 170 g. $TiO_2$, was filtered, washed substantially sulfate free, and peptized with 500 c. c. of a 204 g./l. HCl solution, that is, with 0.60 g. HCl per 1.0 g. $TiO_2$. 3 different parts of the resulting sol were treated as follows:

(1) The first part, containing 20 g. $TiO_2$, was diluted to one liter, and heated 10 minutes at 90° C. to develop the nuclear properties, after which the resulting dispersion appeared clear and stable, with a greenish opalescence.

(2) The second part, containing 60 g. $TiO_2$, was treated with a solution of phosphoric acid corresponding to an amount of $P_2O_5$ equal to 2% of the $TiO_2$ content, diluted to one liter, and heated 10 minutes at 90° C. to develop the nuclear properties. The resulting dispersion was clear and stable, with a greenish opalescence.

(3) The third part, containing 90 g. $TiO_2$, was treated with a solution of phosphoric acid corresponding to an amount of $P_2O_5$ equal to 4% of the $TiO_2$ content, diluted to one liter, and heated 10 minutes at 90° C. to develop the nuclear properties. The resulting dispersion was clear and stable, with greenish opalescence.

(b) By two step precipitation; at 4.5 pH, followed by 7.5 pH.

In this case 598 c. c. of the above solution containing 170 g. $TiO_2$ were treated with 170 g./l. $Na_2CO_3$ to precipitate titanium hydrate at 4.5 pH. The titanium hydrate was filtered and washed to remove the bulk of the $FeSO_4$, then slurried in water, and treated with more of the $Na_2CO_3$ solution to raise the pH value to 7.5. It was then filtered, washed substantially sulfate free, and peptized with 473 c. c. of a 365 g./l. $HNO_3$ solution; that is, with 1.02 g. $HNO_3$ per 1.0 g. $TiO_2$. 3 different parts of the resulting sol were treated as follows:

(1) The first part, containing 20 g. $TiO_2$, was diluted to one liter, and heated 10 minutes at 90° C. to develop the nuclear properties, after which the resulting dispersion appeared clear and stable, with a faint greenish opalescence.

(2) The second part, containing 60 g. $TiO_2$, was treated with a solution of phosphoric acid corresponding to an amount of $P_2O_5$ equal to 2% of the $TiO_2$ content, diluted to one liter, and heated 10 minutes to develop the nuclear properties. The resulting dispersion was clear and stable, with a faint greenish opalescence.

(3) The third part, containing 90 g. $TiO_2$, was treated with a solution of phosphoric acid corresponding to an amount of $P_2O_5$ equal to 4% of the $TiO_2$ content, diluted to one liter, and heated 10 minutes at 90° C. to develop the nuclear properties. The resulting dispersion appeared clear and stable, with a faint greenish opalescence.

Example IV

Titanyl sulfate ($TiO.SO_4.2H_2O$) was dissolved in water to form a pure titanium sulfate liquor and five portions were treated with sodium carbonate to raise the pH values to 3.5, 4.5, 5.5, 6.5 and 7.5 and the hydrates of each portion washed until the filtrates showed no precipitate with $BaCl_2$. The washed hydrates were then tested for sulfate and showed the following amounts, calculated as $H_2SO_4$:

| pH of ppt | 3.5 | 4.5 | 5.5 | 6.5 | 7.5 |
|---|---|---|---|---|---|
| Per cent $H_2SO_4$ | 23.2 | 3.6 | 2.9 | 0.49 | 0.16 |

The hydrates were then peptized with hydrochloric acid to form sols containing 60 g./l. $TiO_2$ and 36 g./l. HCl. The sols were then cured by heating to 90° C. in 15 minutes and holding this temperature for ten minutes, and were then immediately cooled to below 60° C. The resulting dispersions prepared from hydrates precipitated at pH values of 4.5, 5.5 and 6.5 were stable, but those prepared from the hydrates precipitated at pH values of 3.5 and 7.5 were unstable, owing to excess of sulfate in one case and deficiency of sulfate in the other.

Example V

A pure titanium chloride solution prepared from titanium tetrachloride and containing 160 g.l. $TiO_2$ and 188 g./l. HCl was treated with $Na_2CO_3$ to raise the pH to 6.5 and the precipitate washed until the filtrate was chloride free. The precipitate was peptized with HCl in amount such that the weight ratio of HCl to $TiO_2$ was 0.6 to 1.0. The sol was then divided into aliquot parts and treated with $H_2SO_4$ in amounts of 0.0, 0.5, .75, 1.0, 1.5, 2.0, 2.5, 3.0, 4.0, 5.0 and 6.0% by weight of the $TiO_2$ content. Each portion was then cured by heating up to 90° C. in 15 minutes and maintaining this temperature for 10 minutes, and then quickly cooling to below 50° C.

The seed containing no $H_2SO_4$ was opaque, and a white precipitate formed after one hour. The other seeds were opalescent and stable. After two weeks, the seeds treated with 2.5 to 6% $H_2SO_4$ were still colloidal. The other seeds had precipitated within two weeks, but of these it was noted that from day to day the seeds were progressively more stable with increase in sulfate content. It is not practical to employ less $H_2SO_4$ than 0.5% by weight of $TiO_2$ content.

Example VI

A sole of orthotitanic acid peptized with HCl and having a weight ratio of HCl to $TiO_2$ of 0.6 to 1.0 was divided into 2 portions. To one portion was added a solution of citric acid equivalent to an amount of $H_2SO_4$ equal to 0.5% by weight of the $TiO_2$ content of the sol and to the other portion the citric acid solution added was equivalent to an amount of $H_2SO_4$ equal to 5.0% by weight of the $TiO_2$ content of the sol. Each portion was diluted to 60 g./l. $TiO_2$, heated at 90° C. for 10 minutes, after allowing 15 minutes for reaching such temperature, and then cooled quickly. Of the nuclear dispersions resulting, that with the lower amount of citric acid solution showed borderline stability, while the other was a thin stable dispersion.

When employed as seed, each nuclear dispersion served to produce pigments practically wholly of rutile structure, good color and high tinting strength.

All of the nuclear dispersions, prepared by the foregoing examples were successfully dialyzed. Dialysis was performed by placing each nuclear dispersion in a bag-shaped membrane, permeable to HCl, but impermeable to the dispersed titanium hydrate, and circulating fresh water on the outside of the membrane. Chloride ions were thus removed by osmotic action, leaving inside the membrane a nuclear material of unimpaired efficiency, having a gel structure.

When the acid content of the nuclear dispersions had been reduced to about 2–3 g./l. HCl, the resulting gels were used for hydrolyses with the following titanium sulfate liquor:

| | |
|---|---|
| Total $TiO_2$ _____g./l__ | 284 |
| Reduced $TiO_2$ _____g./l__ | 6.1 |
| Fe _____g./l__ | 61 |
| Total $H_2SO_4$ _____g./l__ | 710 |
| Active $H_2SO_4$ _____g./l__ | 603 |
| Acid factor _____ | 1.73 |

These products resulting from dialysis are true gels, as distinguished from previous coagulated seeds which are gelatinous precipitates.

Hydrolyses were made at final concentrations in the range of 160–200 g./l. $TiO_2$ with each of the above dialyzed nuclear agents so that amounts from 0.5% to 5% $TiO_2$ were added as seed on the basis of the $TiO_2$ in the hydrolysis liquor. The hydrolyses were continued at boiling until a yield of 90–95% $TiO_2$ was obtained.

The resulting acid cakes were washed free of impurities and calcined in the range of 925–975° C., producing bright rutile titanium oxide pigments of good color and high tinting strength.

These nuclear gels, when added to a washed anatase acid cake, prior to calcination, were also effective in converting anatase acid cakes into rutile $TiO_2$ during calcination.

The amount of stabilizer acid should generally not exceed 6.5% by weight of the $TiO_2$ content or 55 millimols of stabilizer per mol of $TiO_2$, in order to form a stable dispersion and the minimum amount is slightly under 0.5%, or 4 millimols of stabilizer per mol of $TiO_2$. The experimental results in Example IV show that stable dispersions were obtained where the stabilizer was 0.49–3.6% $H_2SO_4$ or 4–30 millimols of $H_2SO_4$ per mol of $TiO_2$. The experimental results in Example V show that stable dispersions were obtained where the stabilizer was 2.5–6% $H_2SO_4$ or 20–50 millimols of $H_2SO_4$ per mol of $TiO_2$. Consequently when the stabilizer is present in the range of 2.5–3.6% $H_2SO_4$ or 20–30 millimols of $H_2SO_4$ per mol of $TiO_2$, satisfactory results are obtained whether the starting material be titanium sulfate as in Example IV or titanium chloride as in Example V.

The term "stabilize" and its derivatives are used herein to denote impartation to the dispersed titanium hydrate seed of the property of maintaining practically its entire activity, potency and efficiency as a seed for prolonged periods of time after stabilization as distinguished from the relatively short period of effectiveness of the dispersed titanium hydrate seed before stabilization.

The subject matter of the foregoing Examples IV, V and VI also appears in applicant's co-pending application Ser. No. 516,212 filed on even date herewith.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A method comprising dialyzing a colloidal dispersion of titanium hydrate nuclei formed by peptizing a precipitate of titanium hydrate with a monobasic acid and curing the resulting sol by heating to develop nuclei, a stabilizer having polyvalent anions in amount of 4–55 millimols per mol of $TiO_2$ being present in the sol during curing, and thereby removing extraneous anions.

2. A method comprising dialyzing a colloidal dispersion of titanium hydrate nuclei formed by peptizing a precipitate of titanium hydrate with a monobasic acid and curing the resulting sol by heating to develop nuclei, a stabilizer having polyvalent anions in amount of 20–30 millimols per mol of $TiO_2$ being present in the sol during curing, and thereby removing extraneous anions.

3. A method comprising dialyzing a colloidal dispersion of titanium hydrate nuclei formed by peptizing a precipitate of titanium hydrate with a monobasic acid and curing the resulting sol by heating to develop nuclei, a stabilizer having polyvalent anions in amount of 4–30 millimols per mol of $TiO_2$ being present in the sol during curing, and thereby removing extraneous anions.

4. A method comprising dialyzing a colloidal dispersion of titanium hydrate nuclei formed by peptizing a precipitate of titanium hydrate with a monobasic acid and curing the resulting sol by heating to develop nuclei, a stabilizer having polyvalent anions in amount of 20–55 millimols per mol of $TiO_2$ being present in the sol during curing, and thereby removing extraneous anions.

5. A method comprising dialyzing a colloidal dispersion of titanium hydrate nuclei formed by peptizing a precipitate of titanium hydrate with a monobasic acid and curing the resulting sol by heating to develop nuclei, an inorganic stabilizer having polyvalent anions in amount of 4–55 millimols per mol of $TiO_2$ being present in the sol during curing, and thereby removing extraneous anions.

6. A method comprising dialyzing a colloidal dispersion of titanium hydrate nuclei formed by peptizing a precipitate of titanium hydrate with a monobasic acid and curing the resulting sol by heating to develop nuclei, an organic stabilizer having polyvalent anions in amount of 4–55 millimols per mol of $TiO_2$ being present in the sol during curing, and thereby removing extraneous anions.

7. A method comprising dialyzing a colloidal dispersion of titanium hydrate nuclei formed by peptizing a precipitate of titanium hydrate with a monobasic acid and curing the resulting sol by heating to develop nuclei, a stabilizer comprising sulfuric acid in amount of 4–55 millimols per mol of $TiO_2$ being present in the sol during curing, and thereby removing extraneous anions.

8. A method comprising dialyzing a colloidal dispersion of titanium hydrate nuclei formed by peptizing a precipitate of titanium hydrate with a monobasic acid and curing the resulting sol by heating to develop nuclei, a stabilizer comprising phosphoric acid in amount of 4–55 millimols per mol of $TiO_2$ being present in the sol during curing, and thereby removing extraneous anions.

9. A method comprising dialyzing a colloidal dispersion of titanium hydrate nuclei formed by peptizing a precipitate of titanium hydrate with a monobasic acid and curing the resulting sol by heating to develop nuclei, a stabilizer comprising citric acid in amount of 4-55 millimols per mol of $TiO_2$ being present in the sol during curing, and thereby removing extraneous anions.

MAX J. MAYER.

REFERENCES CITED

The following references are of record in the file of this patent:

UNITED STATES PATENTS

| Number | Name | Date |
|---|---|---|
| 2,303,305 | Tillmann | Nov. 24, 1942 |
| 2,303,306 | Tillmann | Nov. 24, 1942 |